UNITED STATES PATENT OFFICE.

JOHN HARVEY KELLOGG, OF BATTLE CREEK, MICHIGAN.

FOOD COMPOUND.

1,001,045. Specification of Letters Patent. Patented Aug. 22, 1911.

No Drawing. Application filed October 19, 1908. Serial No. 458,553.

*To all whom it may concern:*

Be it known that I, JOHN HARVEY KELLOGG, a citizen of the United States, residing at Battle Creek, Calhoun county, Michigan, have invented certain new and useful Improvements in Food Products, of which the following is a specification.

This invention relates to improvements in food products.

The main object of this invention is to provide an improved food product of vegetable origin, which is very palatable and nourishing and adapted for use as a substitute for meat.

A further object is to provide an improved food product which not only resembles meat in nutritive value, but very closely resembles the same in flavor.

A further object is to provide an improved food product embodying these advantages which may be economically produced.

Still further objects will definitely appear from the detailed description to follow.

The invention is clearly defined and pointed out in the claim.

In the preparation of my improved food product I use the following ingredients, preferably in about the proportions stated: gluten, wet, two to three pounds; nut-meal, dry, one pound; and yeast product in the form of concentrated yeast extract, unconcentrated extract, or what I designate as crude yeast product,—that is, the yeast cells and their contents together. Of the yeast extract I preferably use from two to four grams to each pound of the other ingredients combined; of the unconcentrated yeast extract an amount corresponding to the concentrated extract; and, when the crude product is used from one to two ounces to each pound of the other ingredients. I preferably prepare and combine these ingredients in the following manner: I prepare the gluten preferably from wheat flour by washing out the starch. The nut meal is prepared, preferably from peanuts, by hulling and crushing or grinding the same. The yeast product I preferably prepare from waste brewery yeast by first diluting with water and washing through a fine sieve to remove the bitter hop resin, which is, for the most part, to be found in particles coarser than the yeast. I then remove the water, preferably by placing in filtering sacks and pressing. The moist yeast thus obtained is then mixed with from two to five per cent. of salt, under the influence of which the mass liquefies to the consistency of cream, and the yeast cells or envelops are broken, liberating the contents. This is the product which I designate as the crude product. To prepare the extract, water is added, filtered, and the liquid concentrated. If it is desired to use without concentrating, the liquid may be substituted for water. The ingredients are preferably mixed by passing through a shredding machine, the product being passed through several times until the ingredients are thoroughly mixed. The mixed preparation is then cooked by placing in cans and subjecting to a temperature of, from a boiling point to about 230 degrees. The product is a homogeneous mass of meat-like flavor and consistency. The period of cooking and the temperature may be very greatly varied and desirable results still be secured. It is a well known fact that the yeast extract, has a flavor and a nutritive value very similar to meat extract. My improved food compound, by this treatment, very closely resembles meat, not only in flavor, but also in nutritive value and food elements.

The proportions of the ingredients can be considerably varied and valuable results still be secured.

The period and temperature of cooking have a considerable effect on the flavoring and color of the product, although this may be quite largely controlled by the yeast ingredient.

After cooking, the food is ready for serving and may be served either directly from the cans or prepared in a great variety of ways.

My improved food product I find to be a very satisfactory substitute for flesh foods, is very nourishing and may be used in a great variety of ways. If desired, the product cooked as described may be dried into a powder for use in the making of soups, or broths, or the like; or, where it is desired to transport it, as in the case of use in the army, or for travelers' use, it may be dried to lessen the weight. The dried powder can be compressed, if desired, thereby making a comparatively small bulk.

The ingredients are combined by this process so that they become entirely homogeneous and are fixed in this condition,—that is, they do not separate under ordinary treatment for serving.

My improved food product has good keeping qualities and is comparatively economical to produce. It is also advantageous in that it is more digestible than flesh meats, particularly with some invalids and persons with weak stomachs.

While the process described is preferred by me on account of its simplicity and economy with which it may be carried out, I am aware that there are various means of producing and combining the ingredients to accomplish substantially the same results. Further, the proportions of the ingredients may be considerably varied and satisfactory products still be secured.

Having thus described my invention, what I claim as new and desire to secure by Letters Patent is:

An improved food compound comprising gluten, nuts and yeast products combined and cooked substantially as described and in about the proportions specified into a homogeneous mixture of fibrous consistency and meat-like flavor.

In witness whereof, I have hereunto set my hand and seal in the presence of two witnesses.

JOHN HARVEY KELLOGG. [L. S.]

Witnesses:
E. E. SMITH,
LETHA PETTENGILL.

---

Copies of this patent may be obtained for five cents each, by addressing the "Commissioner of Patents, Washington, D. C."